US012715743B2

(12) United States Patent
Chettibi et al.

(10) Patent No.: US 12,715,743 B2
(45) Date of Patent: Aug. 25, 2026

(54) SYSTEM FOR MANAGING WORK MODES OF A MOBILE CRANE ON A WORK SITE

(71) Applicant: AMCS TECHNOLOGIES, Collegien (FR)

(72) Inventors: Mohamed Chettibi, Collegien (FR); Mikael Patinet, Rosny Sous Bois (FR); Frédéric Visserot, Chennevières sur Marne (FR); Jean-Claude Billebaut, Chennevières sur Marne (FR); Said Rkhami, Bussy Sain (FR)

(73) Assignee: AMCS TECHNOLOGIES, Collegien (FR)

( * ) Notice: Subject to any disclaimer, the term of this patent is extended or adjusted under 35 U.S.C. 154(b) by 171 days.

(21) Appl. No.: 18/282,550

(22) PCT Filed: Mar. 9, 2022

(86) PCT No.: PCT/EP2022/055992
§ 371 (c)(1),
(2) Date: Sep. 18, 2023

(87) PCT Pub. No.: WO2022/200041
PCT Pub. Date: Sep. 29, 2022

(65) Prior Publication Data
US 2024/0158209 A1 May 16, 2024

(30) Foreign Application Priority Data
Mar. 24, 2021 (EP) .................................... 21305368

(51) Int. Cl.
*B66C 15/06* (2006.01)
*B66C 15/04* (2006.01)

(52) U.S. Cl.
CPC .......... *B66C 15/065* (2013.01); *B66C 15/045* (2013.01); *B66C 2700/084* (2013.01)

(58) Field of Classification Search
CPC ................ B66C 15/065; B66C 15/045; B66C 2700/084
See application file for complete search history.

(56) References Cited

U.S. PATENT DOCUMENTS

2010/0070179 A1* 3/2010 Cameron .............. G01S 5/0027 701/300
2014/0116975 A1* 5/2014 Benton ................... B66C 23/78 212/302

FOREIGN PATENT DOCUMENTS

FR 2670195 A1 6/1992
FR 3113899 A1 * 3/2022 ............. B66C 23/26
(Continued)

OTHER PUBLICATIONS

International Search Report and Written Opinion received for PCT Application No. PCT/EP2022/055992 dated Jun. 7, 2022, 18 pages including English translation.

*Primary Examiner* — Ig T An
(74) *Attorney, Agent, or Firm* — Helene Laville; HEFIP, LLC

(57) ABSTRACT

A system for managing working modes of a mobile crane in a job site, the system comprising:
- a position sensor for the mobile crane in the job site,
- a position sensor for the hook of the mobile crane relative to a reference point of said mobile crane,
- a module for managing the working mode of the mobile crane configured to define the working mode of the mobile crane selected from:
- the “displacement” mode corresponding to a displacement of the mobile crane in the job site,
- the “fixed work” mode corresponding to a situation in which the mobile crane is fixed in the job site and the position of its hook is variable, (Continued)

a communication device configured to communicate an indication of the working mode of the mobile crane to at least one other crane of the job site.

14 Claims, 3 Drawing Sheets

(56) References Cited

FOREIGN PATENT DOCUMENTS

| | | | | |
|---|---|---|---|---|
| WO | 2013/006625 | A2 | 1/2013 | |
| WO | WO-2020104273 | A1 * | 5/2020 | ............. B66C 23/94 |

* cited by examiner

SYSTEM FOR MANAGING WORK MODES OF A MOBILE CRANE ON A WORK SITE

CROSS REFERENCE TO RELATED APPLICATION

The present application is a U.S. national phase application of a PCT Application No. PCT/EP2022/055992 filed on Mar. 9, 2022, which claims a priority to European Patent Application Ser. No. 21/305,368.9 filed in Europe on Mar. 24, 2021 a disclosure of which are incorporated in their entireties by reference herein.

FIELD OF THE INVENTION

The object of the invention is a system for managing various working modes of a mobile crane in a job site and a collision avoidance management system for a crane in a job site on which is disposed another mobile crane and fitted with a system for managing working modes according to the invention.

PRIOR ART

It is known that in a job site comprising one or more cranes there is a risk of collision between one portion of the crane or of the load carried by the crane and of other elements of the job site.

The applicant has developed a so-called collision avoidance solution that makes it possible to ensure that a crane does not collide with another crane or with an existing structure during the operation of the job site. This type of collision avoidance system comprises a set of sensors for determining in real time the position and the orientation of the boom of the crane as well as the position of the hook of the crane.

The collision avoidance system can be used to avoid a collision with existing structures in the job site. To avoid this type of collision, the collision avoidance system uses a mapping of the job site, defines so-called prohibited areas in which the hook and/or the boom of the crane must not be situated at the risk of having a collision or a load falling.

When the collision avoidance system detects that the boom or the hook of the crane approaches a prohibited area, it is possible to trigger an alarm for the operator of the crane or also act directly on the controls of the crane to limit the displacement and thus avoid any risk of collision.

Collision avoidance systems also make it possible to manage complex job sites in which a plurality of job site machinery may work simultaneously. In particular, it is possible in the same job site to have a plurality of cranes that work at the same time. In such a configuration, it is essential to ensure that the cranes cannot collide with one another.

In order to avoid collisions between cranes in the same job site, the collision avoidance device of a crane needs to know in real time the position of other cranes likely to collide with it.

FIG. 1 illustrates a configuration according to which, two cranes, G1 and G2 work simultaneously in a job site. As illustrated in FIG. 1, it is possible to define for each crane a work area Z1, respectively Z2, in which the boom of each crane is likely to move about.

In dense job sites, it is possible that the work areas Z1 and Z2 partially overlap. A so-called interference area Z1 then exists in which a risk of collision between the two cranes G1 and G2 exists.

The collision avoidance system of the applicant makes it possible to avoid the risk of collision of the two cranes G1 and G2 in particular in the interference area Z1. Typically, if the positions of the two cranes are known (no sensor or communication defects), the collision avoidance system makes it possible for the two cranes to be located simultaneously in the interference area. The system will limit the movements of one crane or the other when it determines (through the calculation of positions) that the elements of the cranes (boom, hook, etc.) come dangerously close.

This collision avoidance system requires knowing in real time the positions of each of the cranes. The cranes of the job site must therefore communicate in real time their respective positions.

It may transpire that the exact position of a crane is unknown, for example, following a defect of one of the position sensors or a defect of the communication device. In such a situation, the collision avoidance devices of other cranes handle the interference area shared with the defective crane as a prohibited area. This action is commonly called activation of the fail-safe control of the collision avoidance device.

For example, if the crane G1 is no longer able to communicate its position to the crane G1 correctly, the collision avoidance device of the crane G2 will handle the interference area as a prohibited area and will prevent the operator of the crane G2 from going into said area.

Activation of the fail-safe control makes it possible to avoid the risks of collision but has an obvious drawback in terms of loss of productivity and possible delay for the job site.

This problem of loss of productivity is all the more significant when one of the cranes is mobile. Indeed, the interference area of a mobile crane extends over the entire job site. Consequently, in the case where it no longer communicates its position, the prohibited area potentially extends to the entire job site.

Thus, with the current collision avoidance system, when a mobile crane in a job site no longer communicates its position correctly, all of the cranes of the job site are stopped. This causes a highly significant loss of productivity and a potential delay in the job site.

Thus, it is necessary to arrange the existing collision avoidance system to make it possible to ensure safety in the job site while making it possible to maintain a level of productivity in the case of a positioning defect of a crane, in particular of a mobile crane.

One object of the present invention is to provide a system for solving this problem.

BRIEF DESCRIPTION OF THE INVENTION

To this end, the object of the present invention is a system for managing working modes of a mobile crane in a job site, the system comprising:

- a position sensor for the mobile crane in the job site,
- a position sensor for the hook of the mobile crane relative to a reference point of said mobile crane,
- a module for managing the working mode of the mobile crane configured to define the working mode of the mobile crane selected from:
- the "displacement" mode corresponding to a displacement of the mobile crane in the job site,
- the "fixed work" mode corresponding to a situation in which the mobile crane is fixed in the job site and the position of its hook is variable, a communication device configured to communicate an indication of the working mode of the mobile crane to at least one other crane of the job site.

Advantageously, a system for managing working modes of a mobile crane in a job site according to the invention makes it possible to limit the impact of a positioning defect of a fixed crane in a job site having a collision avoidance device.

Indeed, the module for managing the working mode makes it possible to distinguish the situations in which the mobile crane is in displacement from situations in which the mobile crane is fixed in the job site.

Advantageously, when the mobile crane is in "fixed work" mode, it can be handled by the collision avoidance system as a fixed crane in the case of a defect on its position. Thus, the prohibited area does not necessarily extend to the entire job site, making it possible to limit the prohibited area to the area around the fixed position of the mobile crane, thus preserving the productivity of the job site.

The system for managing working modes of a mobile crane according to the invention may also comprise one or more of the following features considered alone or according to all possible combinations:

- the communication device is configured to communicate in real time an indication of the position of the mobile crane in the job site as well as the position of the hook of the mobile crane when the mobile crane is in the "displacement" mode to said at least one other crane; and/or
- the communication device is configured to communicate in real time an indication of the position of the hook of the mobile crane when the mobile crane is in the "fixed work" mode to said at least one other crane; and/or
- the position of the hook of the mobile crane is determined by the orientation of the boom of the mobile crane and/or the extension of the boom of the mobile crane and/or the height of the hook of the mobile crane and/or the pitch of the boom of the mobile crane; and/or
- the communication device is configured to communicate an indication of the position of the mobile crane in the job site when switching to the "fixed work" mode; and/or
- the module for managing the working mode of the mobile crane defines the working mode as being "fixed work" when the shoes of the mobile crane are brought out; and/or
- the module for managing the working mode of the mobile crane automatically defines the working mode of the mobile crane by means of the position sensor for the mobile crane in the job site and/or the position sensor for the hook of the mobile crane relative to a reference point of said mobile crane; and/or
- the module for managing the working mode of the mobile crane defines the working mode as being "displacement" by default; and/or
- the module for managing the working mode of the mobile crane is configured to define a "parking" mode corresponding to a situation in which the mobile crane is parked and the position of its hook of its boom is fixed; and/or
- the module for managing the working mode of the mobile crane defines the working mode as being "parking" when the mobile crane is switched off; and/or
- the communication device is configured to communicate an indication of the position of the mobile crane in the job site and the position of the hook of the mobile crane when switching to the "parking" mode; and/or The invention also relates to a collision avoidance management system for a first crane in a job site on which a second crane is disposed, the second crane being mobile and fitted with a system for managing working modes according to the invention, the system comprising:

- a collision avoidance device for the first crane configured to avoid a collision between the first crane and its environment,
- a communication device configured to receive from the second crane:
  - an indication of the position of the second crane in the job site and/or the position of the hook of the boom of the second crane,
  - an indication of the working mode of the second crane,
- a collision avoidance management module configured to, in the case of a defect of the second crane, for example in the case of the loss of position of the second crane, activate the fail-safe control of the collision avoidance device:
  - by handling the second crane as a fixed crane with a known position when said second crane is in the "fixed work" mode, and
- by handling the second crane as a mobile crane with an unknown position when the second crane is in the "displacement" mode.

Advantageously, as the collision avoidance system according to the invention takes into account the working modes of the mobile crane, the loss of productivity in the case of a defect of the mobile crane is limited.

The system for managing working modes of a mobile crane according to the invention may also comprise one or more of the following features considered alone or according to all possible combinations:

- the collision avoidance management module configured to, in the case of a defect of the second crane, activate the fail-safe control of the collision avoidance device by preventing any movement of the first crane when the second crane is in the "displacement" mode; and/or
- the collision avoidance management module is configured to, in the case of a defect of the second crane, activate the fail-safe control of the collision avoidance device by considering the position of the second crane and of its hook as known when said crane is in the "parking" mode; and/or
- the working mode of the second crane is considered as being "in displacement" by the first crane when the first crane does not receive any indication of the working mode of the second crane.

BRIEF DESCRIPTION OF THE FIGURES

Other features and advantages of the present invention will appear upon reading the following description and figures.

It should be noted that these drawings aim to only to illustrate the text of the description and in no way constitute a limitation of the scope of the invention.

In the various figures, similar elements are designated by identical references.

Furthermore, the various embodiments of the invention are compatible with one another.

DETAILED DESCRIPTION OF THE INVENTION

Figure 1:
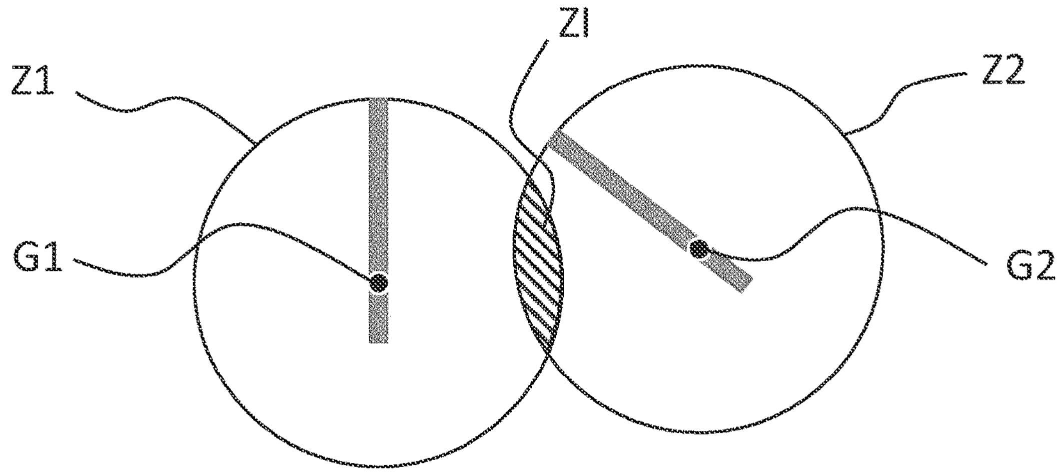
FIG. 1 is a schematic representation of two fixed cranes fitted with a collision avoidance system according to the prior art.
Figure 2:
FIG. 2 is a schematic representation of two cranes one fixed and the other mobile fitted with a collision avoidance system according to the prior art.
Figure 3:
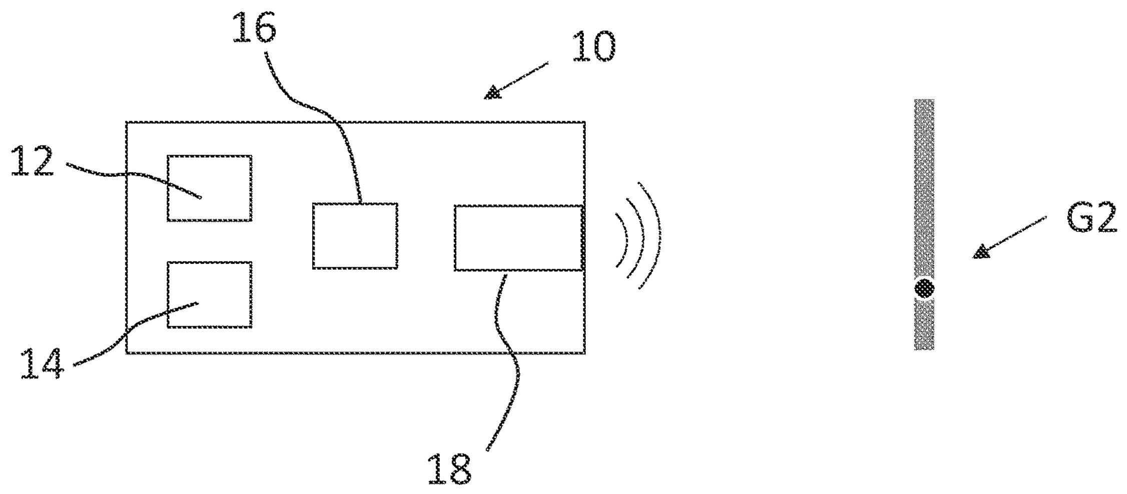
FIG. 3 is a schematic representation of a mobile crane management system according to the invention.

As shown in FIG. 3, the invention relates to a system 10 for managing various working modes of a mobile crane in a job site.

Within the meaning of the invention, mobile crane means a crane configured to move about freely in a job site as opposed to a fixed crane or tower crane the base of which is fixed or moves on a rail in a predefined direction. A mobile crane, also called crane truck, truck mounted crane, self-propelled crane, may move about on wheels or tracks before being deployed for enabling the handling of loads.

As illustrated in FIG. 3, a system for managing various working modes of a mobile crane according to the invention comprises at least:

- one position sensor 12 for the mobile crane in the job site,
- one position sensor 14 for the hook of the mobile crane,
- one module for managing the working mode of the mobile crane 16, and
- one communication device 18.

The position sensor 12 for the mobile crane in the job site makes it possible to determine the position of at least one reference point of the mobile crane in the job site. The position of the mobile crane can be expressed in a reference document for the job site. Typically, the position sensor 12 is configured to enable a geolocation function by a Global Navigation Satellite System (GNSS), for example the GPS, Galileo or Glonass system.

In order to increase the accuracy of the positioning of the mobile crane, the position sensor 12 can also be configured to communicate with a GNSS correction system.

The position sensor 14 for the hook of the mobile crane makes it possible to determine the position of the hook of the mobile crane relative to a fixed point of the crane. The position of the hook of the mobile crane can be determined by the orientation of the boom of the mobile crane and/or the extension of the boom of the mobile crane and/or the height of the hook of the mobile crane and/or the pitch of the boom of the mobile crane.

The module 16 for managing the working mode of the mobile crane 16 is configured to define the working mode of the mobile crane selected from at least:

- the "displacement" mode corresponding to a displacement of the mobile crane in the job site,
- the "fixed work" mode corresponding to a situation in which the mobile crane is fixed in the job site and the position of its hook is variable.

The module for managing the working mode can be connected to the position sensors 12 and 14, for example to determine the working mode of the mobile crane.

Thus, according to a preferred mode of the invention, the module 16 for managing the working mode of the mobile crane automatically defines the working mode of the mobile crane by means of the position sensor for the mobile crane in the job site and/or the position sensor for the hook of the mobile crane relative to a reference point of said mobile crane. Advantageously, such a configuration makes it possible to avoid human intervention and enables the operator of the mobile crane to be able to focus on the operation of the crane.

Alternatively, switching from one working mode to the other can be performed in a totally or partially manual way. For example, the operator of the mobile crane indicates by means of a specific interface the module for managing the working mode in which the mobile crane is situated. The module for managing the working mode can also propose a working mode to the operator who does or does not confirm the working mode determined by the module for managing the working mode.

For safety reasons, it may be preferable for the module for managing the working mode of the mobile crane to be configured to define the working mode as being "displacement" by default. Advantageously, in the case of a defect of the mobile crane, it will be handled by the other cranes of the job site as being in displacement, triggering the activation of the fail-safe control of the collision avoidance devices of the cranes of the job site.

As indicated above, the mobile crane can automatically determine the working mode of the mobile crane, for example, the module for managing the working mode of the mobile crane defines the working mode as being "fixed work" when the shoes of the mobile crane are brought out.

According to one embodiment of the invention, the module 16 for managing the working mode of the mobile crane is configured to define a "parking" mode corresponding to a situation in which the mobile crane is parked and the position of its hook of its boom is fixed. Typically, the mobile crane is parked at a given station, generally with the boom retracted and switched off.

When the module 16 for managing the working mode of the crane is configured in "parking" mode, the position of the crane in the job site and the position of the hook are stored in memory, for example by the other cranes present in the site. Advantageously, when switching off the mobile crane following its parking the productivity of the other cranes in the job site is not impacted.

The communication device 18 is configured to communicate an indication of the working mode of the mobile crane to at least one other crane G2 of the job site. The communication between the communication device 18 and the at least one other crane is typically performed by radiocommunication.

Preferably, the communication device 18 is configured to communicate in real time, typically with a period of less than 2 seconds, preferably less than 1.2 seconds, an indication of the working mode of the mobile crane to the at least one other crane G2.

Within the meaning of the invention, a communication is in real time if the period between two information updates is less than 2 seconds, preferably less than 1.2 seconds.

According to one embodiment of the invention, the communication device is configured to communicate in real time an indication of the position of the mobile crane in the job site as well as the position of the hook of the mobile crane when the mobile crane is in the "displacement" mode to said at least one other crane G2.

In the case of a defect in the communication between the cranes or of a defect of one of the position sensors for the mobile crane, the collision avoidance devices of the other cranes of the job site switch to fail-safe control. When one of these defects occurs while the mobile crane is in the "displacement" mode, all of the cranes of the job site are potentially impacted. Advantageously, the invention makes it possible to limit this impact to situations where the mobile crane is in the "displacement" mode.

The communication device can be configured to communicate in real time, when the mobile crane is in "fixed work" mode, an indication of the position of the hook of the mobile crane to said at least one other crane. In "fixed work" mode, the position of the crane in the job site is known, preferably recorded by all of the cranes of the job site in communication with the mobile crane. It is therefore not necessary to communicate in real time the position of the fixed crane in the job site.

Preferably, the communication device is configured to communicate an indication of the position of the mobile crane in the job site when switching to the "fixed mode".

In the case of a defect in the communication between the cranes or of a defect of one of the position sensors for the hook of the mobile crane, the collision avoidance devices of the other cranes of the job site are activated. When one of these defects occurs while the mobile crane is in "fixed work" mode, only the cranes likely to interfere with the mobile crane depending on its position in the job site are impacted.

Advantageously, when the mobile crane is in "fixed work" mode, the invention makes it possible to limit the impact of a defect of the mobile crane to the interfering cranes alone. In other words, when the mobile crane is in "fixed work" mode, it is handled by the collision avoidance system as a fixed crane.

When the module for managing the working mode of the mobile crane is configured to define a "parking" mode, the communication device can be configured to communicate an indication of the position of the mobile crane in the job site and the position of the hook of the mobile crane when switching to the "parking" mode.

Preferably, the position of the mobile crane and of the movable elements, for example the boom and the hook of the mobile crane, are stored in memory by the other cranes of the job site. Advantageously, when switching off the mobile crane in "parking" mode, the productivity of the interfering cranes is not impacted.

Figure 4:
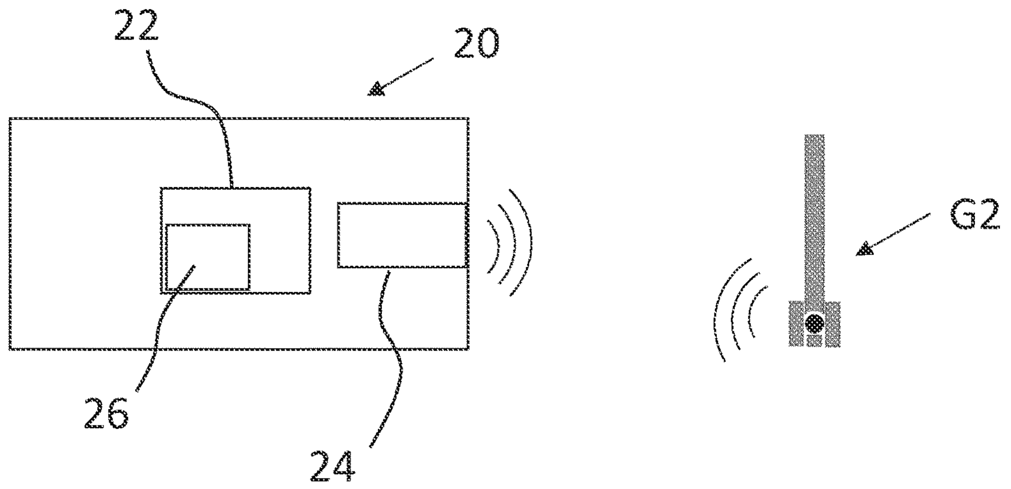
FIG. 4 is a schematic representation of a collision avoidance management system for a first crane in a job site on which a second crane is disposed according to the invention.

The invention also relates to a collision avoidance system illustrated in FIG. 4.

The collision avoidance management system of the invention is intended for a first crane disposed in a job site on which is also disposed a second crane, the second crane being mobile and fitted with a system for managing working modes according to the invention.

The first crane may be a fixed crane, for example a conventional tower crane, or a mobile crane.

As illustrated in FIG. 4, the collision avoidance management system 20 according to the invention comprises at least:

- one collision avoidance device 22 of the first crane,
- one communication device 24, and
- one collision avoidance module 26.

The collision avoidance device 22 of the first crane is configured to avoid a collision between the first crane and its environment.

The collision avoidance management system according to the invention is installed on the first crane and makes it possible in the event of risk of collision of the first crane with an element of its environment to either trigger an alarm or act on the controls of the crane in order to avoid the collision. The collision avoidance management system may be a collision avoidance system already used by the applicant on a large number of job sites. In particular, a way to determine a risk of collision by taking into account the position of the crane and of its hook is known by the person skilled in the art. It is also known by the person skilled in the art a way to trigger an alarm or act on the controls of the crane in case of risk of collision.

The communication device 24 is configured to receive from the second crane an indication of the position of the second crane in the job site and/or the position of the hook of the boom of the second crane. Typically, the communication device 24 is configured to communicate with the second crane in real time and for example by radiocommunication. This type of communication is already used between two fixed cranes for the collision avoidance systems of the applicant.

The indications of the position of the second crane in the job site and/or of the position of the hook of the boom of the second crane are used conventionally by the collision avoidance management system but adapted to take into account the working mode of the second crane.

The communication device 24 is also configured to receive an indication of the working mode of the second crane. Indeed, as the second crane G2 is a mobile crane fitted with a system for managing working modes according to the invention, it can communicate to the first crane an indication of its working mode. The communication of the working mode of the second crane is preferably performed in real time and for example by radiocommunication.

Advantageously, the communication of the working mode of the second crane makes it possible to limit the impact on the productivity of the first crane in the case of a defect of the second crane.

The collision avoidance management module is configured to, in the case of a defect of the second crane, for example in the case of the loss of position of the second crane, activate the fail-safe control of the collision avoidance device of the first crane.

The defect of the second crane, may be a loss of the position of the second crane due for example to a defect of one of the position sensors for the second crane or to a communication defect between the first and the second crane.

For example, the collision avoidance management module may consider that the second crane is defective if during a period of more than 5 seconds, preferably 2 seconds, preferably 1.2 seconds, the communication device 24 of the first crane has not received an indication of the position and/or of the working mode of the second crane.

In the case of a defect of the second crane the module 26 for managing the collision avoidance activates the collision avoidance device 22:

- by handling the second crane as a fixed crane with a known position when said second crane is in the "fixed work" mode, and
- by handling the second crane as a mobile crane with an unknown position when the second crane is in the "displacement" mode.

Advantageously, the fact of handling the second crane as a fixed crane with known position when said second crane is in "fixed work" mode makes it possible to avoid shutting down the entire job site in the case of a defect of the second crane. The prohibited area for the first crane is then limited to the shared area of range with the second crane. In particular, if the respective positions in the job site of the first and second cranes do not imply a shared area of range between the two cranes, the first crane is not impacted by a defect of the second crane.

This is all the more advantageous when the job site comprises a large number of cranes.

In order to ensure the safety in the job site when the second crane is in the "displacement" mode, it is handled by the first crane as having an unknown position. Thus, in the case of a defect of the second crane, the first crane can be stopped until the second crane has been re-established.

In other terms, according to one embodiment the collision avoidance management module 26 is configured to, in the case of a defect of the second crane, activate the fail-safe control of the collision avoidance device by preventing any movement of the first craned when the second crane is in the "displacement" mode.

According to one embodiment of the invention, in the case of a defect of the second crane, an alarm is triggered, for example at the first crane or the collision avoidance device makes it possible to slow down the movements of the first crane.

As indicated above, the system for managing working modes of the second crane can be configured to define a "parking" mode. It is then advantageous that the collision avoidance management module 26 of the collision avoidance management system of the first crane is configured to, in the case of a defect of the second crane, activate the fail-safe control of the collision avoidance device by considering the position of the second crane and of its hook as known when said crane is in the "parking" mode.

As indicated above, the defect of the second crane, may be a loss of the position of the second crane due for example to a defect of one of the position sensors for the second crane or to a communication defect between the first and the second crane.

The taking into account of the "parking" mode of the second by the collision avoidance module of the first crane, makes it possible to also reduce the impact of a defect of the second crane on the productivity of the first crane.

According to one embodiment of the invention, the collision avoidance management module of the first crane is configured to consider the working mode of the second crane as being "in displacement" when the first crane does not receive an indication of the working mode of the second crane.

The collision avoidance management module of the first crane may also comprise a memory for recording the working mode and the position of the second crane. In particular, when the second crane is in "parking" mode, it may be switched off and not necessarily communicate in real time its working mode and/or its position in the job site. Thus, according to one embodiment of the invention, the collision avoidance management module of the first crane is configured to consider the working mode of the second crane as being "in displacement" when the first crane does not receive an indication of the working mode of the second crane and when the mode recorded is not the "parking" mode.

Figure 5:
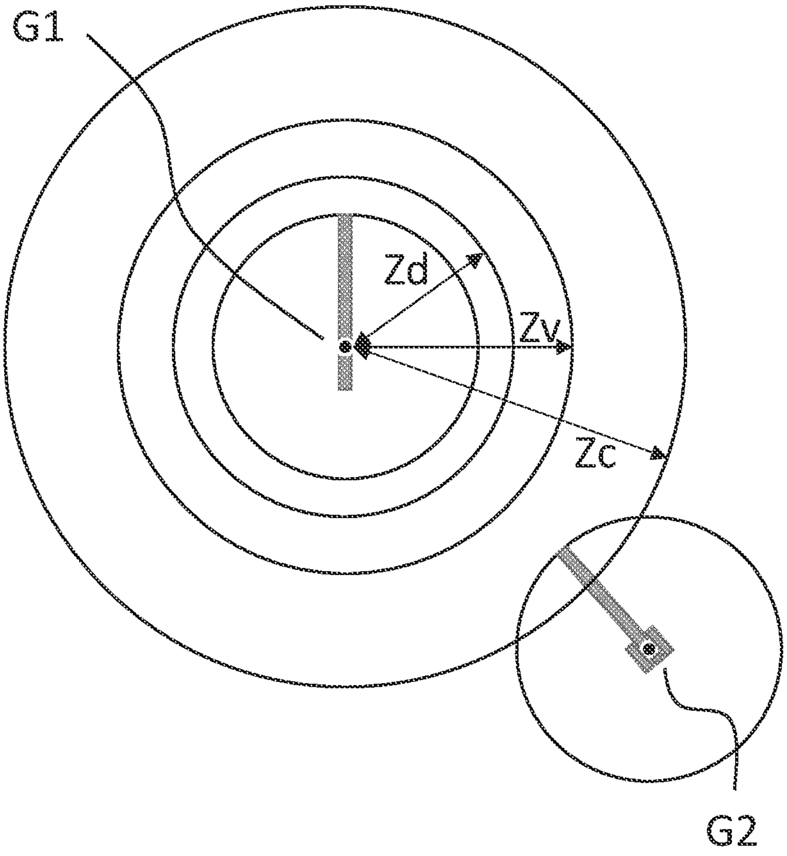
FIG. 5 is a schematic representation of one embodiment of the invention.

According to one embodiment of the invention illustrated in FIG. 5, the communication device 24 of the first crane is configured to send to the second crane a confirmation of the receipt of the indication of the position of the second crane in the job site when the indication of the position of the second crane corresponds to a distance relative to the first crane less than or equal to a first threshold value Zc.

According to this embodiment, the collision avoidance management module of the first crane is configured to activate the collision avoidance device of the first crane when the indication of the position of the second crane corresponds to a distance relative to the first crane less than or equal to a second threshold value Zd lower than the first threshold value Zc.

Typically, the second threshold value Zd is higher than or equal to the sum of the maximum ranges of the first crane and of the second crane. For example, the second threshold value is equal to 1.1 times the sum of the maximum ranges of the first crane and of the second crane.

The first threshold value may be equal to twice the first threshold value. For example, the first threshold value Zc is higher than Zd+10 m.

Advantageously, this embodiment makes it possible to limit the impact on the productivity of the first crane of the defects of the second crane. Indeed, the defects of the second crane are taken into account at the collision avoidance device of the first crane only when the second crane is close enough to the first crane, at a distance less than or equal to a first threshold value Zc.

According to an advantageous embodiment, the collision avoidance management module of the first crane is configured to deactivate the collision avoidance device of the first crane when the indication of the position of the second crane corresponds to a distance relative to the first crane higher than a third threshold value Zd higher than the second threshold value Zd and lower than the first threshold value Zc, for example $Zd<Zv<Zc$, or also $Zd+2\ m \leq Zv \leq Zc-2\ m$.

Advantageously, the use of a third threshold value higher than the second threshold value Zd and lower than the first threshold value Zc for deactivating the device of the first crane makes it possible to avoid, when the second crane moves about at a distance around the second threshold value Zd, untimely triggerings and deactivations of the collision avoidance device of the first crane.

The invention has been described above with the aid of embodiments presented in the figures, without limiting the general inventive concept.

Many other modifications and variations are suggested to the person skilled in the art, after reflection on the various embodiments illustrated in this application.

These embodiments are given by way of examples and are not intended to limit the scope of the invention, which is determined exclusively by the following claims.

In the claims, the word "comprising" does not exclude other elements or steps, and the use of the indefinite article "a" or "an" does not exclude a plurality. The mere fact that different features are enumerated in mutually dependent claims does not indicate that a combination of these features cannot be advantageously used. Finally, any reference used in the claims must not be interpreted as limiting the scope of the invention.

The invention claimed is:

1. A system for managing working modes of a mobile crane in a job site, the system comprising:

a position sensor for the mobile crane in the job site, a position sensor for the hook of the mobile crane relative to a reference point of said mobile crane, a control circuitry configured to determine a working mode of the mobile crane from:

the "displacement" mode corresponding to a displacement of the mobile crane in the job site, the "fixed work" mode corresponding to a situation in which the mobile crane is fixed in the job site and the position of its hook is variable, the control circuitry determining the working mode based at least on signals from the position sensor for the mobile crane and/or the position sensor for the hook and/or a state of deployment of shoes of the mobile crane;

a communication device configured to communicate an indication of the working mode of the mobile crane to at least one other crane of the job site, wherein the control circuitry defines the working mode of the mobile crane by means of the position sensor for the mobile crane in the job site and/or the position sensor for the hook of the mobile crane relative to a reference point of said mobile crane.

2. The system for managing working modes of a mobile crane according to claim 1, wherein the communication device is configured to communicate in real time an indication of the position of the mobile crane in the job site as well as the position of the hook of the mobile crane when the mobile crane is in the "displacement" mode to said at least one other crane.

3. The system for managing working modes of a mobile crane according to claim 1, wherein the communication device is configured to communicate in real time an indication of the position of the hook of the mobile crane when the mobile crane is in the "fixed work" mode to said at least one other crane.

4. The system for managing working modes of a mobile crane according to claim 1, wherein the position of the hook of the mobile crane is determined by the orientation of the boom of the mobile crane and/or the extension of the boom of the mobile crane and/or the height of the hook of the mobile crane and/or the pitch of the boom of the mobile crane.

5. The system for managing working modes of a mobile crane according to claim 1, wherein the communication device is configured to communicate an indication of the position of the mobile crane in the job site when switching to the "fixed work" mode.

6. The system for managing working modes of a mobile crane according to claim 1, wherein the control circuitry defines the working mode as being "fixed work" when the shoes of the mobile crane are brought out.

7. The system for managing working modes of a mobile crane according to claim 1, wherein the control circuitry defines the working mode as being "displacement" by default.

8. The system for managing working modes of a mobile crane according to claim 1, wherein the control circuitry is configured to define a "parking" mode corresponding to a situation in which the mobile crane is parked and the position of its hook of its boom is fixed.

9. The system for managing working modes of a mobile crane according to claim 1, wherein the control circuitry defines the working mode as being "parking" when the mobile crane is switched off.

10. The system for managing working modes of a mobile crane according to claim 1, wherein the communication device is configured to communicate an indication of the position of the mobile crane in the job site and the position of the hook of the mobile crane when switching to the "parking" mode.

11. A collision avoidance management system for a first crane in a job site on which a second crane is disposed, the second crane being mobile and fitted with a system for managing working modes according to claim 1, the collision avoidance management system comprising:

a collision avoidance device for the first crane configured to avoid a collision between the first crane and its environment, a communication device configured to receive from the second crane:

an indication of the position of the second crane in the job site and/or the position of the hook of the boom of the second crane, an indication of the working mode of the second crane, a collision avoidance management circuitry configured to, in the case of a defect of the second crane, activate the fail-safe control of the collision avoidance device:

by handling the second crane as a fixed crane with a known position when said second crane is in the "fixed work" mode, and by handling the second crane as a mobile crane with an unknown position when the second crane is in the "displacement" mode.

12. The collision avoidance management system according to claim 11, wherein the collision avoidance management circuitry is configured to, in the case of a defect of the second crane, activate the fail-safe control of the collision avoidance device, by preventing any movement of the first crane, when the second crane is in the "displacement" mode.

13. The collision avoidance management system according to claim 11 or 12, wherein the collision avoidance management circuitry is configured to, in the case of a default of the second crane, activate the fail-safe control of the collision avoidance device by considering the position of the second crane and of its hook as known when said crane is in the "parking" mode.

14. The collision avoidance management system according to claim 1, wherein the working mode of the second crane is considered as being "in displacement" by the first crane when the first crane does not receive any indication of the working mode of the second crane.

* * * * *